(12) United States Patent
Kunze et al.

(10) Patent No.: US 8,069,708 B2
(45) Date of Patent: Dec. 6, 2011

(54) METHOD FOR DETERMINING THE LIFECYCLE OF A POWER STATION COMPONENT

(75) Inventors: Ulrich Kunze, Bubenreuth (DE); Arno Römpke, Neunkirchen A. Br. (DE)

(73) Assignee: Siemens Aktiengesellschaft, Munich (DE)

( * ) Notice: Subject to any disclaimer, the term of this patent is extended or adjusted under 35 U.S.C. 154(b) by 159 days.

(21) Appl. No.: 12/667,253

(22) PCT Filed: Jun. 27, 2008

(86) PCT No.: PCT/EP2008/058234
§ 371 (c)(1),
(2), (4) Date: Dec. 30, 2009

(87) PCT Pub. No.: WO2009/003927
PCT Pub. Date: Jan. 8, 2009

(65) Prior Publication Data
US 2010/0206058 A1 Aug. 19, 2010

(30) Foreign Application Priority Data
Jul. 2, 2007 (EP) .................................. 07012937

(51) Int. Cl.
*G01M 15/00* (2006.01)
(52) U.S. Cl. .................................................. 73/112.02
(58) Field of Classification Search ................ 73/112.02
See application file for complete search history.

(56) References Cited

U.S. PATENT DOCUMENTS

| | | |
|---|---|---|
| 6,343,251 B1 | 1/2002 | Herron et al. |
| 6,490,543 B1 | 12/2002 | Jaw |
| 6,910,364 B2 * | 6/2005 | Girbig ............................. 73/1.27 |
| 7,076,396 B2 * | 7/2006 | Klausner et al. ............... 702/181 |
| 7,448,853 B2 * | 11/2008 | Mabe et al. ........................ 416/1 |
| 7,496,475 B2 * | 2/2009 | Byrne et al. ..................... 702/184 |
| 7,543,192 B2 * | 6/2009 | Vaidyanathan et al. ..... 714/47.2 |
| 2004/0122621 A1 * | 6/2004 | Vezzu et al. ................... 702/182 |

FOREIGN PATENT DOCUMENTS

| | | |
|---|---|---|
| RU | 2243586 C1 | 12/2004 |
| RU | 2265237 C1 | 11/2005 |
| SU | 978157 A1 | 11/1982 |

OTHER PUBLICATIONS

DIN EN 12952/4:2001-10, "Water tube boilers and system components, Part 4: In-service calculation of the life cycle expectation, German Version EN 12952-4:2000", pp. 1-18, Oct. 2001.
DIN EN 12952/4:2001-10, "Water tube boilers and system components, Part 4: In-service calculation of the life cycle expectation, German Version EN 12952-4:2000", Oct. 2001.

* cited by examiner

*Primary Examiner* — Freddie Kirkland, III

(57) ABSTRACT

A method for determining the life cycle of a power station component is provided. The method includes the following steps: definition of a first characteristic for the life cycle of a power station component at a constant output, definition of a second characteristic for the life cycle of the power station component at a variable output, definition of a first equivalence rule as a function from an actual time parameter, definition of a second equivalence rule wherein the pre-defined operation of the power station component at the variable output in accordance with a plurality of second characteristics is depicted, determination of the numbers of first and second characteristics that are generated during the actual operation of the power station, determination of the sum of the numbers of first and second characteristics, and assessment of the life cycle of the power station component using the determined sum.

9 Claims, 1 Drawing Sheet

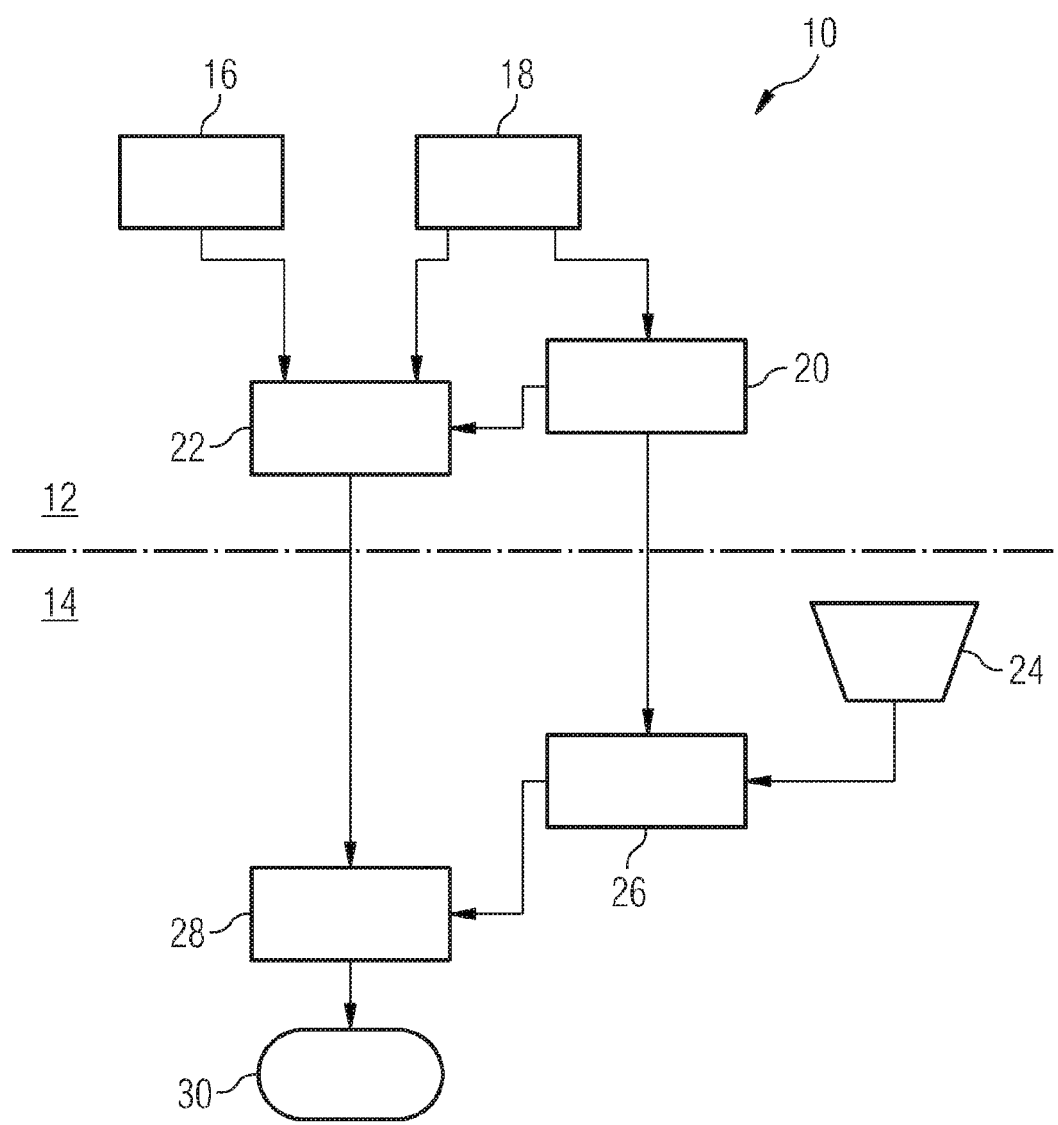

METHOD FOR DETERMINING THE LIFECYCLE OF A POWER STATION COMPONENT

CROSS REFERENCE TO RELATED APPLICATIONS

This application is the US National Stage of International Application No. PCT/EP2008/058234, filed Jun. 27, 2008 and claims the benefit thereof. The International Application claims the benefits of European Patent Office application No. 07012937.4 EP filed Jul. 2, 2007, both of the applications are incorporated by reference herein in their entirety.

FIELD OF INVENTION

The invention relates to a method for determining the life cycle of a power station component, with the life cycle being the maximum operating time of the power station component until it has to be serviced or replaced.

BACKGROUND OF INVENTION

The life cycle of power station components is at present usually determined by initially selecting the assemblies of the power station component that are subject to the highest stress and then individually determining the exhaustion for these assemblies. Methods of creep and cyclic stress exhaustion in particular are used when determining the exhaustion.

Thus, the use of finite element method for a detailed stress analysis of assemblies of power station components is known. With this method, differential equation systems, which describe the stresses present in the assembly, are solved. Input variables for the differential equations are, for example, the pressure and temperature patterns of a medium around the assembly. The material stresses are then determined in precise detail from the calculated stresses.

A disadvantage with the known methods is that they provide only results regarding the exhaustion of individual assemblies or even only of sections of assemblies, whereas an assembly-overlapping, so-called integral, assessment of the life cycle of the complete component is possible, if at all, only at great expense. A higher-level assessment of this kind normally requires the results for the individual assemblies to be interpreted by experts.

Another possible method of determining the life cycle of power station components is the specification, during the design of the power station component, of a pre-defined number of operating hours and starts or trips (i.e. output changes of the power station component).

A comparatively simple, known method is therefore based on counting the operating hours and load changes on the basis of pre-calculated pressure and temperature stresses in the assemblies of a power station component and then comparing these with experimentally determined values of the creep strength and number of insipient crack load changes. This method is used to determine the life cycle of power station boilers (see DIN EN 12952/4:2001-10 "Water tube boilers and system components, Part 4: In-service calculation of the life cycle expectation, German version EN 12952-4:2000"), with such boilers being a particular type of power station component for which a specific type of life cycle determination is necessary due to the particular operating conditions.

The last-named possibility usually fails due to the fact that how the power station component is run in actual operation usually differs from that visualized during design.

SUMMARY OF INVENTION

The object of the invention is to provide a method for determining the life cycle of a power station component which overcomes the aforementioned disadvantages and by means of which, in particular, an overlapping integral assessment of the life cycle of power station components is possible in a particularly simple manner. Of course, compromises can be made with respect to the accuracy of the life cycle determination, provided the determination provides fast results which, in particular, can be interpreted without special knowledge.

The object is achieved according to the invention by means of a method in accordance with the claims. Advantageous developments of the inventive solution are described in the dependent claims.

According to the invention, a method for determining the life cycle of a power station component is proposed, which includes the following steps: Definition of a first characteristic for the life cycle of the power station component at a constant output; definition of a second characteristic for the life cycle of the power station component at a variable output; definition of a first equivalence rule, which is used to reproduce a pre-defined operation of the power station component at a constant output in accordance with a number of first characteristics; definition of a second equivalence rule which is used to reproduce a pre-defined operation of a power station component at a variable output in accordance with a number of second characteristics; determination of the number of first and second characteristics that are generated during the actual operation of the power station; determination of the sum of the numbers of first and second characteristics; assessment of the life cycle of the power station component using the determined sum.

The inventive method is based on the known procedure which during the design stage assumes a life cycle to be achieved for the one power station component. In this case, a load collective is assumed which should largely correspond to the expected subsequent operation of the power station component. Such a load collective consists, for example of a guaranteed number of normal operating hours and a guaranteed number of starts and trips of the power station component in the form of pre-defined running modes of the power station component. As explained above, the actual running mode of the power station component according to the design collective cannot be directly compared with the actual running mode of the power station component. For the assessment of the life cycle of a power station component, the inventive method now furthermore defines integral characteristics with equivalence rules or calculation rules and from these determines a sum of the number of characteristics which then enable a complete conclusion to be reached with respect to the assessment of the life cycle of the power station component. This sum of the number of characteristics can particularly be set in relation to limit values by means of which the necessary servicing and/or replacement intervals for the power station component can be defined.

The inventive solution is especially based on the introduction of two characteristics for an integral life cycle assessment of power station components, of which a first characteristic refers to the life cycle of the power station component at constant output and a second characteristic to the life cycle of the power station component at a varying output. By means of associated equivalence rules, the actual running mode or actual operation of the power station component is, according to the invention, converted to a number of resulting first and second characteristics. The sum of the numbers of the first and second characteristics is determined and on the basis of this an integral or overlapping determination of the life cycle of the power station component can then be made. The equivalence rules can, for example, be formulated in such a way that, starting from an equivalent operating hour at pre-defined constant output, an actual resulting operating hour at an output which is constant but much higher can be defined by a correspondingly high number of equivalent operating hours. In a similar manner, an equivalent start at pre-defined varying output can be specified, based on which a corresponding number of equivalent starts with a different varying output can be determined.

The inventive solution thus particularly includes two stages with unique equivalence rules or calculation rules for the named characteristics being specified in a first stage and then, in a second stage, the sum of the numbers of characteristics being determined by continuously counting and monitoring the specified characteristics (as mentioned, for example, equivalent operating hours and equivalent starts) during the operation of the power station component.

The inventive method can then be particularly advantageously used for the determination of the life cycle of a power station boiler as a power station component. This is particularly applicable because with such power station boilers only a few operating parameters can be specified for the equivalence rules to be defined according to the invention. The inventive equivalence rules can thus be particularly advantageously referenced to the live steam pressure situation and/or the temperature difference on the power station boiler resulting during an operating case.

With the inventive method, the aforementioned equivalent operating hour can be particularly advantageously defined as an operating hour of the power station component at rated parameters. The rated parameters form the starting point for specification data of the operating case, from which according to the invention a conversion from generally resulting operating cases to these standard operating cases can be specified, particularly by means of a weighting. The weighting is particularly determined so that it reflects the life cycle usage of individual assemblies of the power station component, particularly those to be serviced or repaired.

The first equivalence rule is in this case particularly advantageously defined as a function from one actual time parameter, at least one actual operating parameter of the power station component and a weighting factor. The equivalence or calculation rule for an equivalent operating hour of a power station boiler is therefore advantageously; $t_{EOH} = t^{\hat{}} p/p_{o+}$, with $t_{tEOH}$ being equal to the equivalent operating hour, t being equal to the time (in hours), p being equal to the live steam pressure in the area under consideration, $p_o$ being equal to the live steam pressure at rated output and $\hat{}$ being equal to the weighting.

As a second characteristic, a typical cold start at rated parameters of the power station component is particularly advantageously defined according to the invention.

As an alternative or addition, the second characteristic is advantageously designed as a half typical hot start at rated parameters of the power station component.

The equivalence rule for the characteristic variable for a life cycle of the power station component with a varying output is particularly advantageously based on different calculation rules for three operating cases, with the second characteristic being formed from a constant value unequal to zero, the second characteristic being calculated in a second operating case from at least one actual operating parameter of the power station component and a weighting factor, and the second characteristic being formed in a third operating case from the value zero. The calculation rules in this case are based on transients (this means a time-limited pattern of the operating parameter on the power station component in which the power station component changes from one operating state to another).

The transients are classified in a first operating case of tripping or load shedding, during which the second characteristic according to the invention assumes a constant value unequal to zero, for example 20.

As a second operating case, a relevant transient is defined at which the second characteristic is calculated from at least one actual operating parameter of the power station component and a weighting factor. Thus, with a relevant output transition of this kind, a number of equivalent starts can be calculated, for example, as a second characteristic, as follows: $N_{NES} = K^* \Delta T^* \max (\Delta T/\Delta t)$ whereby $n_{NES}$ is the number of equivalent starts, K is the constant or weighting determined from a typical start, $\Delta T$ is the temperature difference during the operating case and $\Delta T/\Delta t$ is the temperature gradient during the operating case.

As a so-called other transient, a third operating case is then defined, at which although an output change takes place it has no, or almost no, influence on the actual life cycle of the power station component, so that the value O can be assigned to the second characteristic.

In order to further simplify the method and in particular to make a life cycle determination possible with respect to only one limit value, it is advantageous to convert each operating case into a single characteristic, starting from the first and second characteristics. In this case the second characteristic is particularly advantageously converted to a predetermined number of first characteristics. The aforementioned number of equivalent starts can thus be advantageously converted to a number of equivalent hours, so that only one limit value is formed and also only one comparison is necessary with respect to the permissible life cycle.

The inventive solution can be further modified in that the equivalence or calculation rules, and in particular the weighting used therein, can be adjusted on the basis of a comparison of the life cycle of the power station component, pre-established using the pre-determined characteristics, with the actual resulting life cycle of the power station component. In this case, especially for power station boilers as power station components, known data on the operation of existing power station boilers can be used and if necessary also other main parameters of the power station boiler can be included in the provided equivalence rules.

The inventive method for determining the life cycle of a power station component has the particular advantage that no special knowledge is necessary for its application. For the manufacturer of power station components and especially for a power station boiler manufacturer, the method offers the advantage that the specifications of the design load collective can be simply converted to the actual running mode. Because, according to the invention, the weighting used can be easily modified within the equivalence rules, the parameters defined for a power station component can be easily transferred to other power station components. This in turn is particularly advantageous, especially with regard to a power station boiler as a power station component.

For repair and maintenance, particularly of power station boilers, the inventive method offers the advantage that the inspection time points can be particularly easily specified relative to the actual running mode of the power station boiler.

BRIEF DESCRIPTION OF THE DRAWINGS

An inventive method for determining the life cycle of a power station component is explained in more detail in the following with the aid of the accompanying schematic drawings.

The drawing shows a flow diagram of an example of the inventive method.

DETAILED DESCRIPTION OF INVENTION

The method 10 shown in the diagram is essentially carried out in two stages 12 and 14. Within stage 12, design load collectives for a power station component in the form of a power station boiler, not shown in more detail in the drawing, are specified in a first step 16.

In parallel with this, in a second step 18 a group of specification data of at least one operating case is specified for an equivalent operating hour (EOH) and at least one operating case for an equivalent start (NES).

Furthermore, in a second step 20 a group of specification data of the weights or of the weighting for conversion of the general operating case to the pre-defined or specified operating cases is specified. This specification data of the weights for conversion of general operating cases represents equivalence rules, by means of which a pre-defined operation of the power station component at a constant output on one hand and at a varying output on the other can be depicted relative to a number of characteristics. The characteristics are on one hand the aforementioned equivalent operating hour (as a characteristic for a life cycle of the power station component at constant output) and on the other hand the aforementioned equivalent start (as a characteristic for a life cycle of the power station component during varying output).

Furthermore in a step 22, values on the basis of the aforementioned design load collective limit (see step 16), the specification data of the operating case for an equivalent operating hour and of the operating case for an equivalent start (see step 18), and the specification data of the weights for conversion of general operating case (see step 20) are defined, with inspection time points during the operation of the power station boiler being specified on the basis of the limit values.

In the second step 14 of the inventive method 10, acquired measured value data of main parameters of the power station boiler, i.e. especially its output, with its temperatures at components and its pressures at components, are also, in a step 24, recorded, and buffered if necessary, during the actual operation of the power station boiler. Then in a step 26, on the basis of this determined acquired measured value data and the equivalence rules specified in step 20, the resulting number of first and second characteristics, i.e. the number of equivalent operating hours (EOH) and the number of equivalent starts (NES) is determined.

Thus, for example, on the basis of an equivalence or calculation rule for equivalent operating hours (EOH), what the number of equivalent operating hours, with respect to an actual present number of operating hours for a different live steam pressure situation should be is specified. This takes place in the present example using the calculation rule: $t_{EOH}=t*(p/p_o)^\Delta$, whereby $t_{EOH}$ is the equivalent operating hours, t is the time (in hours), p is the live steam pressure at rated output in the case under consideration, $p_o$ is the live steam pressure at rated output and $\Delta$ is the exponent of the weighting for EOH, in the present case, e.g. 3.0.

A further calculation rule for the equivalent starts (NES) is based on so-called transients, which refers to a time limited pattern of operating parameters, in which the power station component changes from one operating state to another. The transients are initially classified in three operating cases, with a first operating case being defined as a tripping or load shedding, a second operating case as a so-called relevant transient and a third operating case as a so-called other transient. The equivalence or calculation rule for the equivalent starts (NES) is then specified as follows: For the first operating case $n_{NES}=20$, for the second operating case $n_{NES}=K*\Delta T*\max(\Delta T/\Delta t)$, and for the third operating case $n_{NES}=0$, with $n_{NES}$ being the number of equivalent starts, K being a constant determined from a typical start for weighting for NES, $\Delta T$ being the temperature difference during the operating case and $\Delta T/\Delta t$ being the temperature gradient during the operating case.

The limit values are determined taking account of the equivalence or calculation rules and the parameters of the load cases of the particular design load collective in that the weighted and calculation rules are applied to the operating cases of the design load collective. From this, xEOH and yNES are obtained as limit values (G).

From these weighted and equivalence rules, both the main parameters of the power station boiler (output, temperatures and pressures), measured in step 24, and also the characteristics EOH and NES are determined and counted, so that during operation their actual achieved value i.e. the number of first and second characteristics, is present.

In a step 28, this number is compared with the limit values defined in step 22 in such a way that firstly the sum of the numbers of the first and second characteristics is formed and then compared with the corresponding limit values of the specified inspection time points, The result is output in a step 30, so that an assessment of the inspection situation of the power station boiler which is fast and easy to perform is possible.

The invention claimed is:

1. A method for determining the life cycle of a power station component, comprising:
   defining a first characteristic for the life cycle of the power station component at a constant output;
   defining a second characteristic for the life cycle of the power station component at a variable output;
   defining a first equivalence rule as a function of an actual time parameter, an operating parameter of the power station component and a weighting wherein a pre-defined operation of the power station component at a constant output relative to a plurality of first characteristics is depicted;
   defining a second equivalence rule wherein the pre-defined operation of the power station component at the variable output in accordance with a plurality of second characteristics is depicted;
   determining the plurality of first characteristics and the plurality of second characteristics generated during an actual operation of the power station;
   determining a sum of the plurality of first characteristics and the plurality of second characteristics; and
   assessing the life cycle of the power station component using the determined sum.

2. The method as claimed in claim 1, wherein a power station boiler is used as the power station component.

3. The method as claimed in claim 1, wherein the first characteristic is defined as an operating hour of the power station component at a plurality of rated parameters.

4. The method as claimed in claim 1, wherein the second characteristic is defined as a typical cold start at the plurality of rated parameters of the power station component.

5. The method as claimed in claim 4,
wherein the second characteristic is arranged differently according to three operating cases,
wherein for the first operating case the second characteristic is a constant value unequal to zero,
wherein for the second operating case the second characteristic is calculated from an actual operating parameter of the power station component and a weighting factor, and
wherein for the third operating case, the second characteristic is a value of zero.

6. The method as claimed in claim 1, wherein the second characteristic is defined as a typical warm start at a plurality of rated parameters of the power station component.

7. The method as claimed in claim 6,
wherein the second characteristic is arranged differently according to three operating cases,
wherein for the first operating case the second characteristic is a constant value unequal to zero,
wherein for the second operating case the second characteristic is calculated from an actual operating parameter of the power station component and a weighting factor, and
wherein for the third operating case, the second characteristic is a value of zero.

8. The method as claimed in claim 1, wherein each operating case is converted to a single characteristic unit on the basis of the first and second characteristics.

9. The method as claimed in claim 1, wherein the first and second equivalence rules are adapted using a comparison of the life cycle of the power station component pre-established using the pre-determined characteristics and the actual resulting life cycle of the power station component.

* * * * *